May 4, 1965  J. DROUBAY  3,181,228
METHOD FOR PRODUCING BALL POINTS AND THEIR PROTECTING CAPS
Filed July 30, 1962
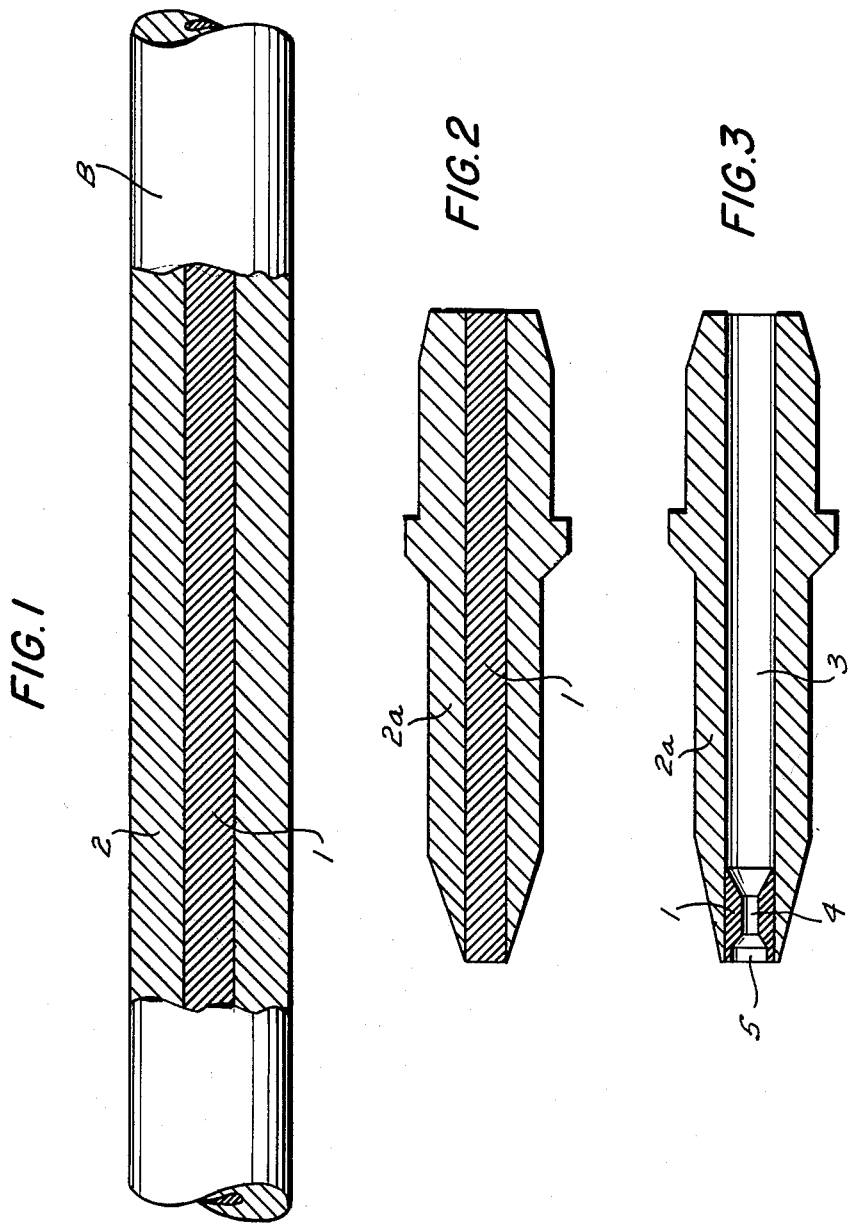
INVENTOR
Jean Droubay
BY
Michael S. Striker
ATTORNEY

3,181,228
METHOD FOR PRODUCING BALL POINTS AND THEIR PROTECTING CAPS
Jean Droubay, Chamonix, Haute-Savoie, France, assignor to A. J. Fagard & Cie, Paris, France, a French limited partnership company of France
Filed July 30, 1962, Ser. No. 213,377
Claims priority, application France, Aug. 10, 1961, 870,574
5 Claims. (Cl. 29—149.5)

It has already been proposed to cut out the untimely wear of the outer surface of the ball-holding section of the ball point of ball point refills and pens and the drawbacks resulting therefrom by covering the actual ball point made generally of a soft material with a cap of a protecting material resisting abrasion. Now, the methods proposed for reaching such a result have for their drawback to lead to an important increase of the cost price which is not consistent with the commercial requirements of ball point pens.

The present invention has for its object a method for producing a ball point provided with a protecting cap for ball point pens, said method being characterized by the use of a bimetallic bar incorporating a core of a suitable soft metal furthering the rolling of the ball and the diameter of which is at least equal to that of the conventional ball-securing edge and a peripheral section coaxially enclosing said core and the diameter of which is at least equal to the maximum diameter of the ball point to be obtained, said peripheral section being made of a metal resisting the abrasion produced by the paper; the bar is first cut to the desired length and then machined in a conventional manner, through the boring of the ink feeding channel, of its capillary extension and of the housing of the ball after which the peripheral section is machined on a lathe and lastly the ball is set in its housing.

The core of the bar is made of one of the metals generally used for the production of ball points, whereas the peripheral section may advantageously be made of tempered chromium-plated steel or of stainless steel.

The invention also covers, by way of a novel article of manufacture, the ball points obtained in conformity with said improved method, starting from a bimetallic bar.

The invention will be better understood from the reading of the following disclosure, reference being made to the accompanying drawing wherein:

FIG. 1 is an elevational partly sectional view of a portion of a bimetallic bar which is to serve for the execution of the invention, FIG. 2 illustrates cross-sectionally the bar after outward machining, FIG. 3 shows similarly the ball point in its finished condition before the ball is set therein.

As clearly apparent from inspection of FIG. 1, the bimetallic bar B is constituted by a core 1 of a comparatively soft metal such as one of those generally used for executing ball points, brass for instance, and by a peripheral coaxial section 2 made of a metal resisting the abrasion produced by the paper such, for instance, as tempered chromium-plated steel or stainless steel.

Said bar B, after it has been cut to the desired length, is turned on the lathe so as to assume the conventional shape illustrated at 2a in FIG. 2 or any other suitable shape after which it is bored as illustrated in FIG. 3 so as to produce the channel 3 for the introduction of ink, the capillary channel 4 beyond the latter and the terminal cylindro-conical housing 5 for the ball. Lastly, the ball is set inside its housing in accordance with conventional procedure.

The diameter of the core 1 should be at least equal to the outer diameter of the edge through which the ball is held in position. In the example illustrated, the latter diameter and the diameter of the ink feeding channel have been illustrated as being exactly equal to the diameter of the core, but this is by no means essential to the invention.

The diameter of the outer peripheral section 2 should of course be at least equal to the maximum diameter of the ball point to be produced.

What I claim is:

1. A method for producing ball points for ball point pens including their protecting cap, starting from a bimetallic bar constituted by a core of a metal facilitating the rolling of the ball and an outer sheath section of a harder metal, said method consisting in cutting the bar to a predetermined length, boring inside the core of the bar, an ink feeding channel followed by a short coaxial capillary channel and by a terminal ball housing, turning the outer surface of the outer sheath section of the bar to the desired shape and setting the ball in its housing, whereby the ball will be seated on the soft core and the hard outer sheath encompasses the ball seat to provide a wear resistant surface.

2. In a method for producing writing tips for ball point pens comprising the steps of forming an elongated member with a solid central core extending longitudinally through the whole length of said member and being made from a material facilitating the rolling of the ball of the ball point pen and with an outer sheath of a material harder than that of said core and having an outer surface of desired shape; boring through said elongated member an ink feeding channel extending axially from one toward but short of the other end thereof; and forming at said other end and in said central core a terminal ball housing and between said ball housing and said ink feeding channel a short capillary channel.

3. In a method for producing writing tips for ball point pens comprising the steps of forming an elongated member with a solid central core extending longitudinally through the whole length of said member and being made from a material facilitating the rolling of the ball of the ball point pen and with an outer sheath of a material harder than that of said core and having an outer surface of desired shape; removing said central core from one end portion of said elongated member to leave only a short portion thereof at the other end of said elongated member so as to form in said elongated member and ink feeding channel extending from one toward but short of the other end of said elongated member; and forming at said other end and in said central core a terminal ball housing and between said ball housing and said ink feeding channel a short capillary channel.

4. In a method for producing writing tips for ball point pens comprising the steps of forming a rod shaped metal member of predetermined length and desired outer surface with a solid central core portion extending axially therethrough and which is softer than the outer portion of said rod-shaped metal member; boring centrally through said rod-shaped member an ink feeding channel extending from one toward but short of the other end of said member; and forming in said other end of said member in said soft core portion thereof a terminal ball housing and between said terminal ball housing and said ink feeding channel a short capillary channel.

5. A method of producing writing tips for ball point pens comprising the steps of forming an elongated bar having a central core extending longitudinally through said bar and being made from material facilitating the rolling of the ball of the ball point pen and an outer sheath of material harder than that of said core; cutting off a portion of predetermined length from said bar; boring through said cut-off portion an ink feeding channel extending axially from one toward but short of the other end of said cut-off portion and a capillary channel of a cross section smaller than that of said core coaxial with said ink feeding channel and forming an extension of the same; and forming at said other end of said cut-off portion and in said central core a terminal ball housing coaxial with and of a diameter greater than that of said capillary channel and communicating with the latter.

References Cited by the Examiner

UNITED STATES PATENTS

| | | | |
|---|---|---|---|
| 1,753,638 | 4/30 | Axtell | 29—481 |
| 2,551,490 | 5/51 | Ferst et al. | 120—42.4 |
| 2,646,761 | 7/53 | Knobel | 29—441 |
| 2,834,321 | 5/58 | Dufrene | 120—42.4 |
| 3,009,240 | 11/61 | Brown | 29—441 |
| 3,109,231 | 11/63 | Johnson | 29—411 |

FOREIGN PATENTS

| | | |
|---|---|---|
| 965,583 | 2/50 | France. |
| 819,954 | 11/51 | Germany. |
| 336,365 | 10/30 | Great Britain. |

WHITMORE A. WILTZ, *Primary Examiner.*

JOSEPH D. BEIN, *Examiner.*